United States Patent
Glugla et al.

(10) Patent No.: US 9,695,755 B2
(45) Date of Patent: *Jul. 4, 2017

(54) METHOD AND SYSTEM FOR PRE-IGNITION CONTROL

(71) Applicant: Ford Global Technologies, LLC, Dearborn, MI (US)

(72) Inventors: Chris Paul Glugla, Macomb, MI (US);
Robert Sarow Baskins, Grass Lake, MI (US); James Matthew Kindree, South Lyon, MI (US); Paul A. Pietrzyk, Beverly Hills, MI (US); Mark Paul Guerrier, Gravesend (GB); Rama Sanghvi, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,623

(22) Filed: Aug. 2, 2016

(65) Prior Publication Data
US 2016/0341133 A1 Nov. 24, 2016

Related U.S. Application Data

(63) Continuation of application No. 14/162,634, filed on Jan. 23, 2014, now Pat. No. 9,404,407.

(51) Int. Cl.
*F01N 3/10* (2006.01)
*F01L 1/34* (2006.01)
(Continued)

(52) U.S. Cl.
CPC ........... *F02D 13/0261* (2013.01); *F01N 3/10* (2013.01); *F01N 11/005* (2013.01); *F02B 37/168* (2013.01); *F02B 37/183* (2013.01);
*F02B 39/16* (2013.01); *F02D 9/02* (2013.01); *F02D 11/105* (2013.01); *F02D 13/0203* (2013.01);
(Continued)

(58) Field of Classification Search
CPC ...... F01N 3/10; F01N 11/005; F02D 13/0203; F02D 13/0261; F02D 41/0007; F02D 41/025; F02D 41/10; F02D 41/107; F02D 41/0025; F02D 35/027; F02D 35/028;
(Continued)

(56) References Cited

U.S. PATENT DOCUMENTS

| | | | | |
|---|---|---|---|---|
| 5,230,320 A | * | 7/1993 | Hitomi | F01L 1/26 123/308 |
| 6,971,360 B2 | | 12/2005 | Katayama | |

(Continued)

FOREIGN PATENT DOCUMENTS

JP 2007263082 A 10/2007

*Primary Examiner* — Nicholas J Weiss
*Assistant Examiner* — Dapinder Singh
(74) *Attorney, Agent, or Firm* — Julia Voutyras; McCoy Russell LLP

(57) ABSTRACT

Methods and systems are provided for addressing pre-ignition occurring while operating with blow-though air delivery. A variable cam timing device used to provide positive intake to exhaust valve overlap is adjusted in response to an indication of pre-ignition to transiently reduce valve overlap. Pre-ignition mitigating load limiting and enrichment applied during a blow-through mode is adjusted differently from those applied when blow-through air is not being delivered.

10 Claims, 8 Drawing Sheets

(51) Int. Cl.

| | | |
|---|---|---|
| *F02B 33/44* | (2006.01) | |
| *F02D 45/00* | (2006.01) | |
| *F02D 13/02* | (2006.01) | |
| *F02D 35/02* | (2006.01) | |
| *F01N 11/00* | (2006.01) | |
| *F02D 41/00* | (2006.01) | |
| *F02D 41/02* | (2006.01) | |
| *F02D 41/10* | (2006.01) | |
| *F02B 37/16* | (2006.01) | |
| *F02D 21/08* | (2006.01) | |
| *F02B 39/16* | (2006.01) | |
| *F02D 9/02* | (2006.01) | |
| *F02D 11/10* | (2006.01) | |
| *F02D 41/30* | (2006.01) | |
| *F02P 5/152* | (2006.01) | |
| *F02B 37/18* | (2006.01) | |

(52) U.S. Cl.
CPC ........... *F02D 21/08* (2013.01); *F02D 35/027* (2013.01); *F02D 41/0007* (2013.01); *F02D 41/0025* (2013.01); *F02D 41/025* (2013.01); *F02D 41/10* (2013.01); *F02D 41/107* (2013.01); *F02D 41/3005* (2013.01); *F02P 5/1528* (2013.01); *F02B 37/18* (2013.01); *F02B 2039/168* (2013.01); *F02D 35/028* (2013.01); *F02D 2041/001* (2013.01); *F02D 2041/0265* (2013.01); *F02D 2200/0802* (2013.01); *F02D 2200/602* (2013.01); *Y02T 10/144* (2013.01); *Y02T 10/18* (2013.01); *Y02T 10/26* (2013.01)

(58) Field of Classification Search
CPC ........ F02D 21/08; F02B 37/168; F02B 37/18; Y02T 10/144; Y02T 10/26
USPC ................................................ 60/602, 605.1
See application file for complete search history.

(56) References Cited

U.S. PATENT DOCUMENTS

| | | | |
|---|---|---|---|
| 7,318,314 B2* | 1/2008 | Pagot | F02B 37/00 123/316 |
| 7,730,874 B2* | 6/2010 | Leduc | F02B 17/00 123/432 |
| 8,061,136 B2 | 11/2011 | Delp et al. | |
| 8,135,535 B2 | 3/2012 | Karnik et al. | |
| 8,406,984 B2 | 3/2013 | Glugla et al. | |
| 2011/0106410 A1 | 5/2011 | Yoshino et al. | |
| 2011/0209685 A1 | 9/2011 | Shane et al. | |
| 2011/0302917 A1 | 12/2011 | Styles et al. | |
| 2013/0054109 A1 | 2/2013 | Buslepp et al. | |
| 2013/0139786 A1 | 6/2013 | Glugla et al. | |
| 2013/0311068 A1 | 11/2013 | Rollinger et al. | |

* cited by examiner

METHOD AND SYSTEM FOR PRE-IGNITION CONTROL

CROSS-REFERENCE TO RELATED APPLICATIONS

The present application is a continuation of U.S. patent application Ser. No. 14/162,634, entitled "METHOD AND SYSTEM FOR PRE-IGNITION CONTROL," filed on Jan. 23, 2014, now U.S. Pat. No. 9,404,407, the entire contents of which are hereby incorporated by reference for all purposes.

FIELD

The present description relates generally to methods and systems for mitigating pre-ignition in an engine operating with blow-through air.

BACKGROUND/SUMMARY

A boosted engine may offer greater fuel efficiency and lower emissions than a naturally aspirated engine of similar power. During transient conditions, however, the power, fuel efficiency, and emissions-control performance of a boosted engine may suffer. Such transient conditions may include rapidly increasing or decreasing operator torque demand, engine load, engine speed, or mass air flow. For example, when the engine output torque requested increases rapidly, a turbocharger compressor may require increased input (e.g., torque) from a turbocharger turbine, via exhaust mass flow, to deliver an increased boosted air flow to the engine. Such torque may not be available, however, if the turbine that drives the compressor is not fully spun up. As a result, an undesirable power lag may occur before the intake air flow builds to the required level.

To reduce the power lag, boosted engines may be operated in a blow-through mode wherein valve timing is adjusted to increase positive valve overlap. The increased valve overlap increases energy delivered to the turbine, reducing the overall time to boost. However, the inventors herein have recognized that when operating in the blow-through mode, which includes low engine speed and high engine load conditions, the engine may be prone to abnormal combustion events such as due to pre-ignition. The early abnormal combustion due to pre-ignition can cause very high in-cylinder pressures, and can result in combustion pressure waves similar to combustion knock, but with larger intensity. Such abnormal combustion events can cause rapid engine degradation.

While pre-ignition events may be mitigated by reducing the output of the boosting device or enriching the pre-ignition affected cylinder, as shown by Buslepp et al in US Patent Application 2013/0054109, these mitigating adjustments may not be viable options when operating in the blow through mode. As an example, during the blow through mode, the engine is typically operated with stoichiometric air-fuel ratio in the cylinder but lean at the exhaust catalyst due to the flow of air from the intake into the exhaust during the period of high valve overlap. During such conditions, pre-ignition mitigation using temporary cylinder enrichment may cause catalyst degradation due to overheating. Specifically, the excess oxygen available at the catalyst may react with the rich fuel injected following pre-ignition detection leading to an over-temperature condition at the catalyst. As another example, reducing the output of the boosting device may affect the engine torque output and turbo lag.

In view of these issues, the inventors have developed a method for addressing pre-ignition that may occur while the engine is operated with valve overlap. One example method comprises: while operating in a blow-through mode, reducing valve overlap in response to an indication of pre-ignition. In this way, pre-ignition occurrence during blow-through operation may be reduced.

In one example, an engine may be operated in a blow-through mode during conditions when turbo lag is likely, such as during a tip-in event. Therein, a variable cam timing device may be actuated to adjust a first intake or exhaust valve timing of one or more engine cylinders from a timing with no valve overlap to a timing with more positive valve overlap, such as with full positive intake to exhaust valve overlap. The flow of air from the intake to the exhaust via the cylinders is used to reduce time to torque. In response to an indication of pre-ignition received while operating in the blow-through mode, a controller may increment a first pre-ignition counter independent of a second pre-ignition counter that is incremented only in response to an indication of pre-ignition received while operating outside the blow-through mode. When the output of the first pre-ignition counter exceeds an upper threshold, load limiting actions may be taken. Specifically, engine load may be limited by reducing the blow-through of air, such as by adjusting the variable cam timing device to reduce the positive valve overlap. In one example, the engine may be temporarily operated with no valve overlap. In addition, the engine may be temporarily enriched. As the engine load is limited via reduction in valve overlap, the occurrence of pre-ignition events drops, and the first counter may be decremented. As the output of the first counter gradually drops, the valve overlap may be gradually increased until engine operation with higher (e.g., full) positive valve overlap is resumed.

As such, when the engine is not operating in the blow-through mode, the second, pre-ignition counter may be incremented and pre-ignition mitigating actions may be taken when the output of the second counter exceeds a threshold. The mitigating actions may include enrichment of the pre-ignition affected cylinder, as well as one or more additional cylinders. The actions may also include limiting of an engine load by reducing an intake throttle opening, or operating the waste gate at a more open position reducing overall boost. The second counter may then be decremented as the engine load is limited and the occurrence of pre-ignition events drops. As the second counter is decremented, the throttle opening (or wastegate opening) may be increased until stoichiometric engine operation with nominal throttle and wastegate settings are resumed.

In this way, an engine's propensity to pre-ignite while operating in a blow-through mode can be reduced. By enabling extra mass flow and enthalpy to be provided in the exhaust via the use of positive valve overlap, blow-through air can be advantageously used to expedite turbine spin-up and reduce turbo lag without degrading engine performance. By temporarily decreasing the amount of valve overlap in response to pre-ignition, catalyst overheating and engine degradation can be reduced. By adjusting valve timing to reduce the engine load in the blow-through mode, pre-ignition can be mitigated while enabling blow-through operations to be rapidly resumed. By extending the use of blow-through air, engine performance benefits are extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 7:
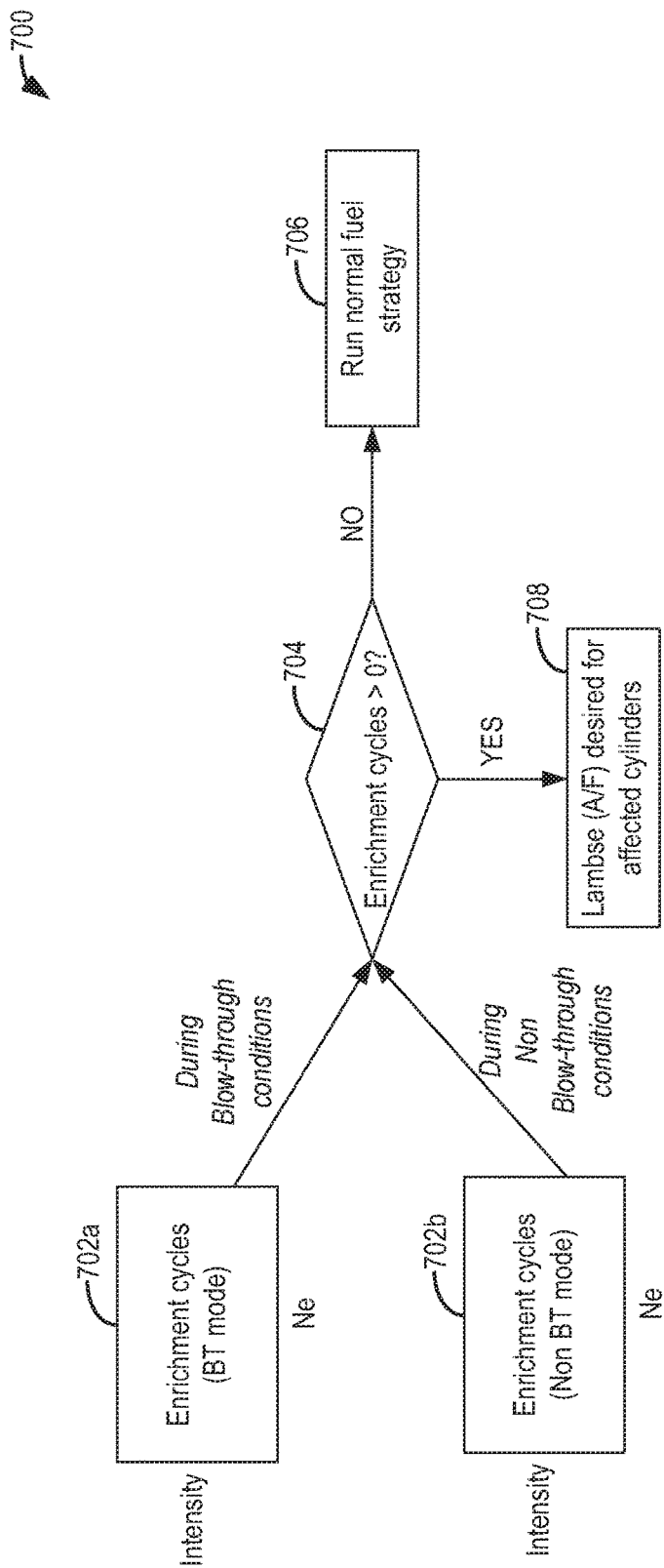
Figure 8:
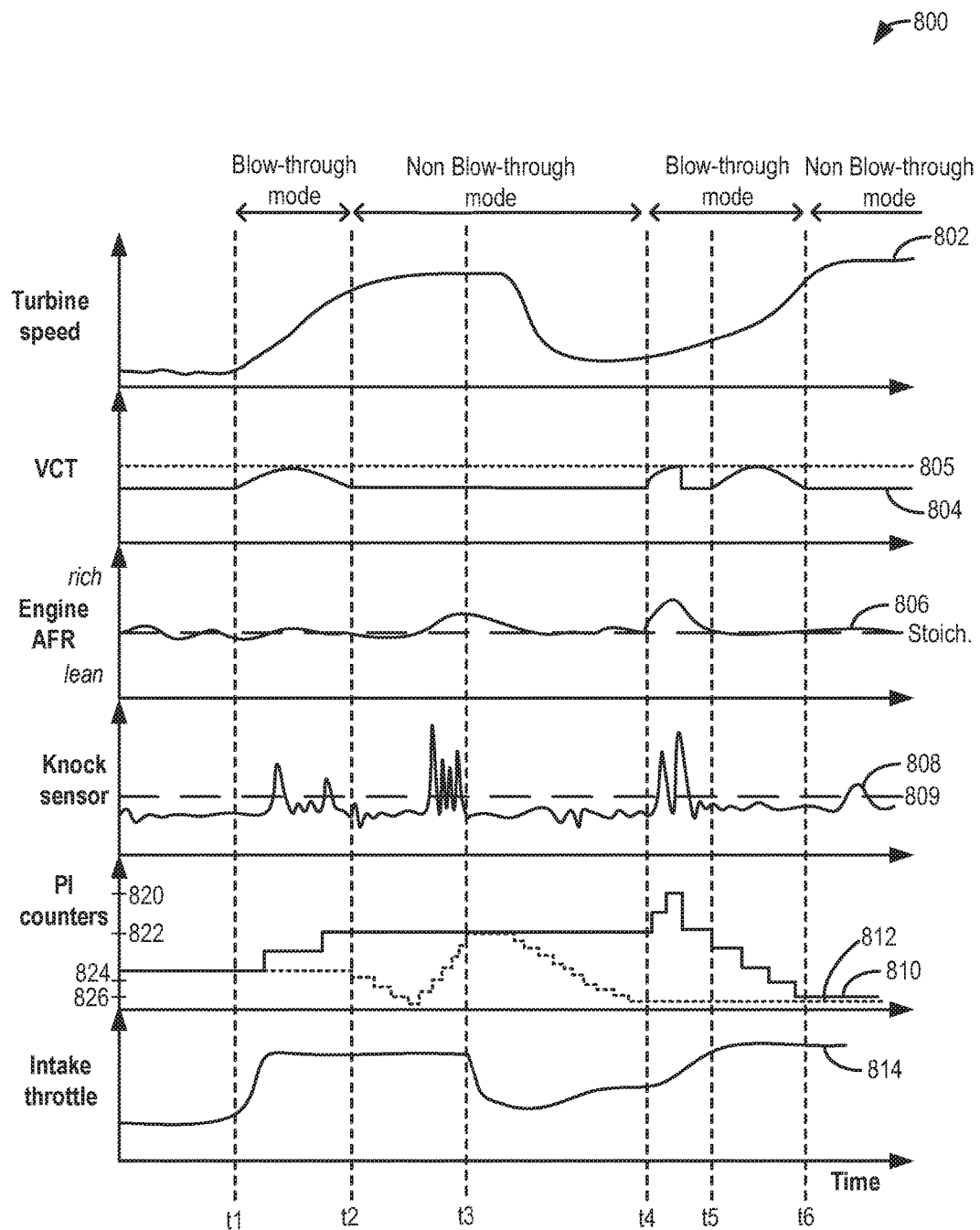
FIG. 8 shows an example of mitigating steps performed in response to an indication of pre-ignition while operating in the blow-through mode, according to the present disclosure.

Methods and systems are provided for reducing turbo lag by directing an amount of intake air from an intake manifold to an exhaust manifold of an engine system (such as the engine system of FIGS. 1-2) via engine cylinders using positive valve overlap. In response to a tip-in, an engine controller may perform a control routine, such as the routine of FIG. 3, to operate the engine in a blow-through mode wherein blow-through air is delivered to the exhaust manifold to expedite turbine spin-up. In response to an indication of pre-ignition received while operating in the blow-through mode, an engine controller may perform selective pre-ignition mitigating steps that may be different from mitigating actions performed while operating in a non blow-through mode. For example, the controller may perform a control routine, such as the example routine of FIG. 4, to limit an engine load via valve overlap adjustments in the blow-through mode while using engine load limiting via intake throttle adjustments in the non blow-through mode. Load limiting adjustments may be based on valve timing, valve overlap, turbine speed, etc., as discussed at FIGS. 5-7. An example pre-ignition mitigation performed while flowing blow-through air is depicted at FIG. 8.

Figure 1:
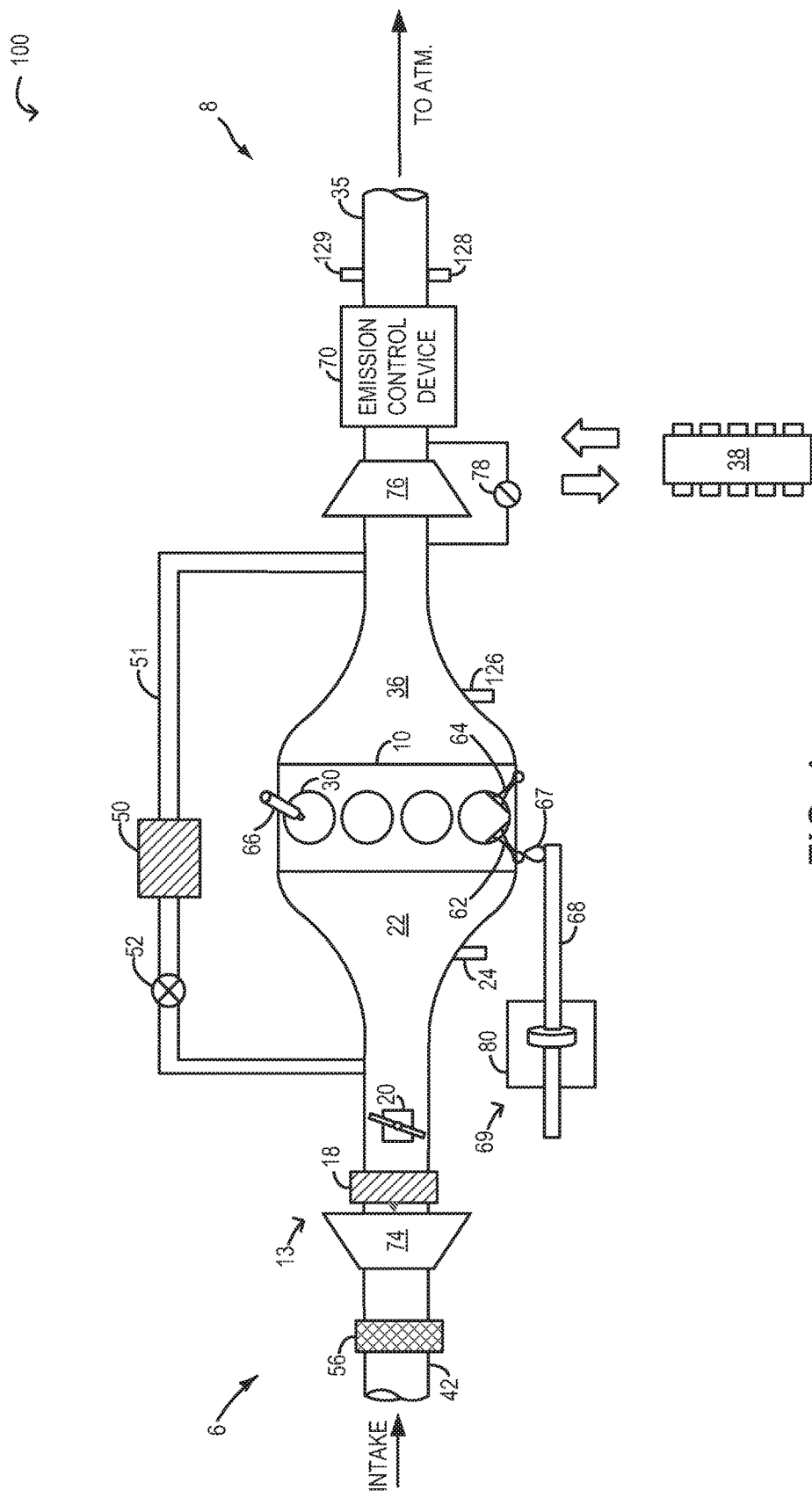
FIG. 1 schematically shows aspects of an example engine system in accordance with an embodiment of this disclosure.

FIG. 1 schematically shows aspects of an example engine system 100 including an engine 10. In the depicted embodiment, engine 10 is a boosted engine coupled to a turbocharger 13 including a compressor 74 driven by a turbine 76. Specifically, fresh air is introduced along intake passage 42 into engine 10 via air cleaner 56 and flows to compressor 74. A flow rate of ambient air that enters the intake system through intake air passage 42 can be controlled at least in part by adjusting intake throttle 20. Compressor 74 may be any suitable intake-air compressor, such as a motor-driven or driveshaft driven supercharger compressor. In engine system 10, however, the compressor is a turbocharger compressor mechanically coupled to turbine 76 via a shaft 19, the turbine 76 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 74 is coupled, through charge-air cooler 18 to intake throttle 20. Intake throttle 20 is coupled to engine intake manifold 22. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 74. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 30 through a series of intake valves (such as intake valve 62). The combustion chambers are further coupled to exhaust manifold 36 via a series of exhaust valves (such as exhaust valve 64). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system.

Combustion chambers 30 may be supplied one or more fuels, such as gasoline, alcohol fuel blends, diesel, biodiesel, compressed natural gas, etc. Fuel may be supplied to the combustion chambers via injector 66. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

Exhaust from exhaust manifold 36 is directed to turbine 76 to drive the turbine. When reduced turbine torque is desired, some exhaust may be directed instead through a wastegate 78, by-passing the turbine. The combined flow from the turbine and the wastegate 78 then flows through emission control device 70. In general, one or more emission control devices 70 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow. All or part of the treated exhaust from emission control device 70 may be released into the atmosphere via exhaust conduit 35.

Depending on operating conditions, a portion of exhaust may be recirculated from the exhaust manifold 36, upstream of turbine 76, to intake manifold 22, downstream of compressor 74 via EGR passage 51, through EGR cooler 50 and EGR valve 52. In this manner, high pressure exhaust gas recirculation (HP-EGR) may be enabled. In some embodiments, in addition to the HP-EGR, low pressure exhaust gas recirculation (LP-EGR) may also be enabled wherein a portion of treated exhaust is recirculated from the exhaust manifold 36, downstream of turbine 76, to intake manifold 22, upstream of compressor 74 via a low pressure EGR passage and therein coupled EGR cooler and EGR valve (not shown). EGR valve 52 may be opened to admit a controlled amount of cooled exhaust gas to the intake manifold for desirable combustion and emissions-control performance. The relatively long EGR flow path in engine system 10 provides excellent homogenization of the exhaust gas into the intake air charge. Further, the disposition of EGR take-off and mixing points provides very effective cooling of the exhaust gas for increased available EGR mass and improved performance.

Each cylinder 30 may be serviced by one or more valves. In the present example, each cylinder 30 includes a corresponding intake valve 62 and an exhaust valve 64. Engine system 100 further includes one or more camshafts 68 for operating intake valve 62 and/or exhaust valve 64. In the depicted example, intake camshaft 68 is coupled to intake valve 62 and can be actuated to operate intake valve 62. In some embodiments, where the intake valve of a plurality of cylinders 30 are coupled to a common camshaft, intake camshaft 68 can be actuated to operate the intake valves of all the coupled cylinders.

Intake valve 62 is actuatable between an open position that allows intake air into the corresponding cylinder and a closed position substantially blocking intake air from the cylinder. Intake camshaft 68 may be included in intake valve actuation system 69. Intake camshaft 68 includes intake cam 67 which has a cam lobe profile for opening intake valve 62 for a defined intake duration. In some embodiments (not shown), the camshaft may include additional intake cams with an alternate cam lobe profile that allows the intake valve 62 to be opened for an alternate duration (herein also referred to as a cam profile switching system). Based on the lobe profile of the additional cam, the alternate duration may be longer or shorter than the defined intake duration of intake cam 67. The lobe profile may affect cam lift height, cam duration, and/or cam timing. A controller may be able to switch the intake valve duration by moving intake camshaft 68 longitudinally and switching between cam profiles.

In the same manner, each exhaust valve 64 is actuatable between an open position allowing exhaust gas out of the corresponding cylinder and a closed position substantially retaining gas within the cylinder. It will be appreciated that while only intake valve 62 is shown to be cam-actuated, exhaust valve 64 may also be actuated by a similar exhaust camshaft (not shown). In some embodiments, where the exhaust valve of a plurality of cylinders 30 is coupled to a common camshaft, the exhaust camshaft can be actuated to operate the exhaust valves of all the coupled cylinders. As with intake camshaft 68, when included, the exhaust camshaft may include an exhaust cam having a cam lobe profile for opening exhaust valve 64 for a defined exhaust duration. In some embodiments, the exhaust camshaft may further include additional exhaust cams with an alternate cam lobe profile that allows exhaust valve 64 to be opened for an alternate duration. The lobe profile may affect cam lift height, cam duration, and/or cam timing. A controller may be able to switch the exhaust valve duration by moving the exhaust camshaft longitudinally and switching between cam profiles.

It will be appreciated that the intake and/or exhaust camshafts may be coupled to cylinder subsets, and multiple intake and/or exhaust camshafts may be present. For example, a first intake camshaft may be coupled to the intake valves of a first subset of cylinders while a second intake camshaft may be coupled to the intake valves of a second subset of cylinders. Likewise, a first exhaust camshaft may be coupled to the exhaust valves of a first subset of cylinders while a second exhaust camshaft may be coupled to the exhaust valves of a second subset of cylinders. Further still, one or more intake valves and exhaust valves may be coupled to each camshaft. The subset of cylinders coupled to the camshaft may be based on their position along an engine block, their firing order, the engine configuration, etc.

Intake valve actuation system 69 and exhaust valve actuation system (not shown) may further include push rods, rocker arms, tappets, etc. Such devices and features may control actuation of the intake valve 62 and the exhaust valve 64 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 30 may each have more than one exhaust valve and/or intake valve. In still other examples, each of the exhaust valve 64 and intake valve 62 of one or more cylinders may be actuated by a common camshaft. Further still, in some examples, some of the intake valves 62 and/or exhaust valves 64 may be actuated by their own independent camshaft or other device.

Engine system 100 may include variable valve timing systems, for example, variable cam timing VCT system 80. A variable valve timing system may be configured to open a first valve for a first duration during a first operating mode. The first operating mode may occur at an engine load below a part engine load threshold. Further, the variable valve timing system may be configured to open the first valve for a second duration, shorter than the first duration, during a second operating mode. The second operating mode may occur at an engine load above an engine load threshold and an engine speed below an engine speed threshold (e.g., during low to mid engine speeds).

VCT system 80 may be a twin independent variable camshaft timing system, for changing intake valve timing and exhaust valve timing independently of each other. VCT system 80 includes intake camshaft phaser 82 coupled to the common intake camshaft 68 for changing intake valve timing. The VCT system may likewise include an exhaust camshaft phaser coupled to a common exhaust camshaft for changing exhaust valve timing. VCT system 80 may be configured to advance or retard valve timing by advancing or retarding cam timing and may be controlled by controller 38. VCT system 80 may be configured to vary the timing of valve opening and closing events by varying the relationship between the crankshaft position and the camshaft position. For example, VCT system 80 may be configured to rotate intake camshaft 68 independently of the crankshaft to cause the valve timing to be advanced or retarded. In some embodiments, VCT system 80 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 80.

By adjusting VCT system 80, a position of intake camshaft 68 can be adjusted to thereby vary an opening and/or closing timing of intake valve 62. As such, by varying the opening and closing of intake valve 62, an amount of positive overlap between intake valve 62 and exhaust valve 64 can be varied. For example, VCT system 80 may be adjusted to advance or retard an opening and/or a closing of intake valve 62 relative to a piston position.

During engine operation, a cylinder piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke. During cylinder combustion, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

Based on the timing differences between exhaust valve closing and intake valve opening, the valves may be operated with negative valve overlap wherein for a short duration after the end of the exhaust stroke and before the commencement of the intake stroke, both intake and exhaust valves are closed. This period, during which both valves are closed, is referred to as negative (intake to exhaust) valve overlap. In one example, the VCT system may be adjusted so that the negative intake to exhaust valve overlap timing may be a default cam position of the engine during cylinder combustion.

Alternatively, the valves may be operated with positive valve overlap wherein for a short duration before the end of the exhaust stroke and after the commencement of the intake stroke, both intake and exhaust valves may be open. This period, during which both valves may be open, is referred to as a positive (intake to exhaust) valve overlap. As elaborated herein, the VCT system 80 may be adjusted so that an amount of positive valve overlap during selected boosted engine operating conditions to increase positive valve overlap. Specifically, a position of the intake camshaft may be adjusted such that an opening of the intake valve timing is advanced. Consequently, the intake valve may be opened earlier before the end of the exhaust stroke and a duration over which both valves are open may be increased, leading to more positive valve overlap. As one example, positive valve overlap may be increased by moving the intake camshaft from a position of some positive valve overlap to a position having more positive valve overlap. As another example, positive valve overlap may be increased by moving the intake camshaft from a position of negative valve overlap to a position of positive valve overlap. In one example, the VCT system may be adjusted so that the negative intake to exhaust valve overlap timing may be a default cam position of the engine during an engine cold-start.

It will be appreciated that while the above example suggests increasing positive valve overlap by advancing intake opening timing, in alternate examples, positive valve overlap may be increased by adjusting an exhaust camshaft to retard exhaust valve closing. Further still, each of the intake and the exhaust camshafts may be adjusted to vary the positive valve overlap by varying both the intake and the exhaust valve timings.

In engine system 100, during periods of rapidly increasing engine load, such as immediately after start-up, upon tip-in, or upon exiting DFSO, the amount of intake air compression provided by the compressor may be inadequate. During at least some of these conditions, the amount of boost pressure available from the compressor may be limited due to the turbine not being spun up to a sufficiently high rotational speed (for example, due to low exhaust temperature or pressure). As such, the time required for the turbine to spin up and drive the compressor to provide the required amount of compressed intake air is referred to as turbo lag. During turbo-lag, the amount of torque provided may not match the torque demand, leading to a drop in engine performance.

To expedite turbine spin-up and reduce turbo lag, the engine may be operated in a blow-through mode during those conditions. Therein, an amount of compressed intake air, herein also referred to as blow-through air, may be directed from the intake manifold to the exhaust manifold, while maintaining stoichiometric cylinder combustion, to provide extra mass flow for spinning up the turbine. In some embodiments, a fuel injection may be adjusted (e.g., enriched) commensurate with the blow-through air amount to provide extra enthalpy for spinning up the turbine. The blow-through air may be provided while the engine has at least some boost, that is, while an intake manifold pressure (MAP) is higher than the exhaust manifold pressure by at least a threshold amount. Based on engine operating conditions prevalent at the time blow-through air is requested, an amount of valve overlap is adjusted so that the required amount of blow-through air can be provided to the turbine via the engine cylinders through positive valve overlap.

For example, to provide the blow-through via the engine cylinders, VCT system 80 may be adjusted from an initial position having no positive valve overlap to a final position having increased positive valve overlap. In one example, the final position may be position of full valve overlap (or maximum positive valve overlap). While the methods herein discuss providing blow-through air always via positive valve overlap, in alternate embodiments, blow-through air may be provided via positive valve overlap only if the valve timing for providing positive valve overlap does not degrade engine fuel economy, combustion stability, and torque output.

Figure 3:
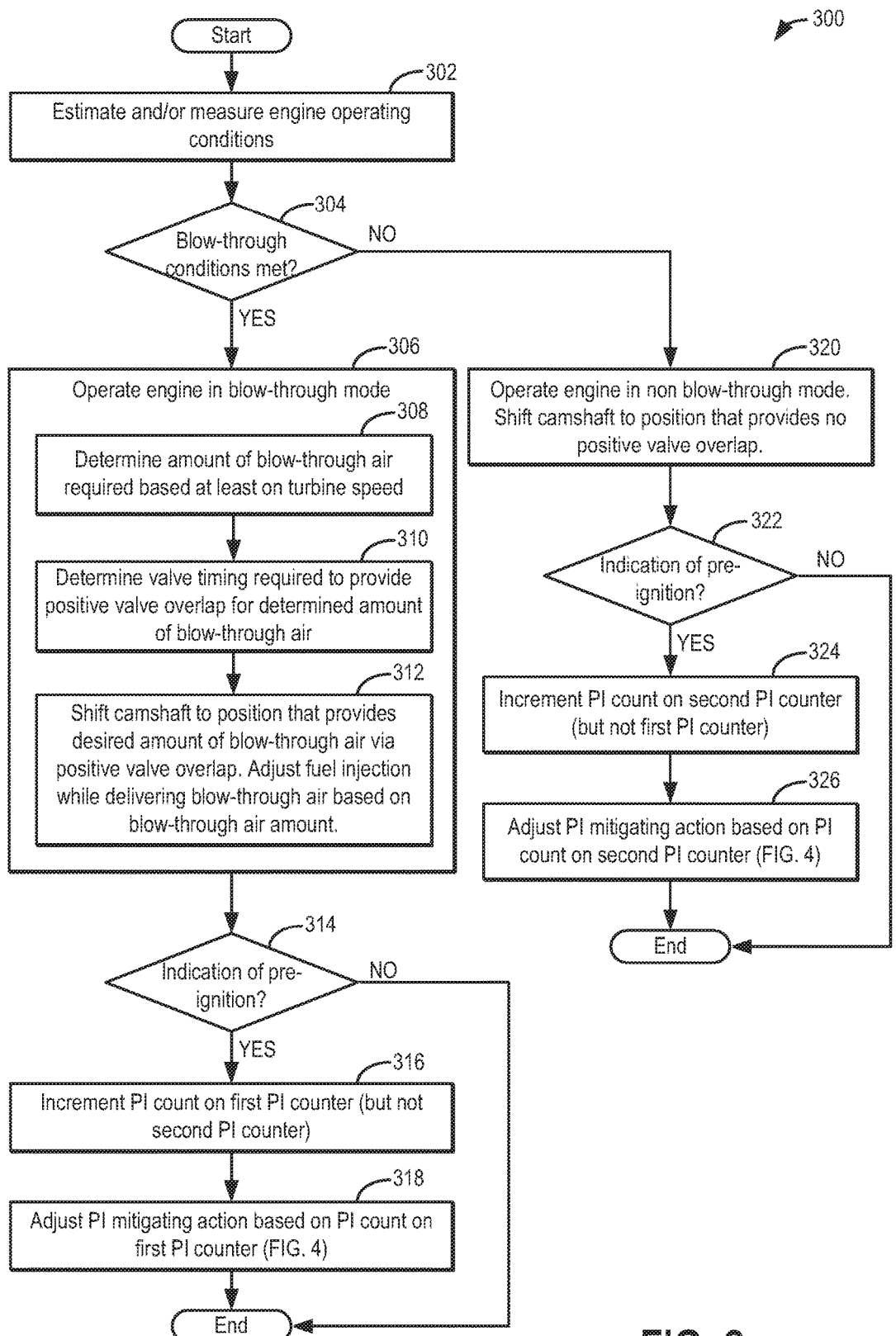
FIG. 3 shows a high level flow chart for operating in the blow-through mode.

As elaborated with reference to FIG. 3, based on the engine operating conditions, an engine controller may select engine operation in a blow-through mode and adjust an amount of blow-through air delivered via positive valve overlap. Alternatively, the controller may maintain engine operation in a non blow-through mode where no blow-through air is delivered.

As such, during operation in the blow-through mode, abnormal combustion events such as those due to pre-ignition are more likely to occur. This is because the conditions where the blow-through mode is typically used, that is, high load low engine speed conditions, are also the same conditions where the propensity for pre-ignition is higher. While cylinder pre-ignition may be conventionally addressed by mitigating actions such as enriching the affected cylinder or reducing the engine load by reducing intake airflow, the inventors herein have recognized that the conventional mitigating steps may exacerbate pre-ignition in the blow-through mode, while also degrading engine performance. For example, cylinder enrichment can lead to exhaust catalyst overheating and thereby catalyst degradation. This is because in the blow-through mode, the engine is operated with stoichiometric air-fuel ratio in the cylinder but lean at the exhaust catalyst due to the flow of air from the intake into the exhaust during the period of high valve overlap. The use of pre-ignition mitigating temporary cylinder enrichment during such conditions causes the rich fuel to react with the excess oxygen at the catalyst leading to an over-temperature condition at the catalyst. In addition, engine load limiting by reducing airflow can reduce the benefits of the blow-through mode. As elaborated herein with reference to FIGS. 3-4, the engine controller may address pre-ignition differently based on whether pre-ignition was indicated during the blow-through mode or the non blow-through mode. For example, engine load limiting may be performed via distinct adjustments in each mode. Likewise, the controller may also indicate and count pre-ignition differently (e.g., on distinct counters that are independent of each other) when in the blow-through mode versus the non blow-through mode.

FIG. 1 also shows electronic control system 38, which may be any electronic control system of the vehicle in which engine system 10 is installed. In embodiments where at least one intake or exhaust valve is configured to open and close according to an adjustable timing, the adjustable timing may be controlled via the electronic control system to regulate an amount of exhaust present in a combustion chamber during ignition. The electronic control system may also be configured to command the opening, closure and/or adjustment of various other electronically actuated valves in the engine system—throttle valves, compressor by-pass valves, waste gates, EGR valves and shut-off valves, various reservoir intake and exhaust valves, for example—as needed to enact any of the control functions described herein. Further, to assess operating conditions in connection with the control functions of the engine system, the electronic control system may be operatively coupled to a plurality of sensors arranged throughout the engine system—flow sensors, temperature sensors, pedal-position sensors, pressure sensors, etc.

As described above, FIG. 1 shows a non-limiting example of an internal combustion engine. It should be understood that in some embodiments, the engine may have more or less combustion cylinders, control valves, throttles, and compression devices, among others. Example engines may have cylinders arranged in a "V" configuration. Further, a common intake camshaft may control the intake valves for a first set of cylinders on a first bank while a second intake camshaft may control the intake valves for a second set of cylinders on a second bank. That is, a common camshaft of a cam actuation system (e.g., a VCT system) may be used to control valve operation of a group of cylinders.

Figure 2:
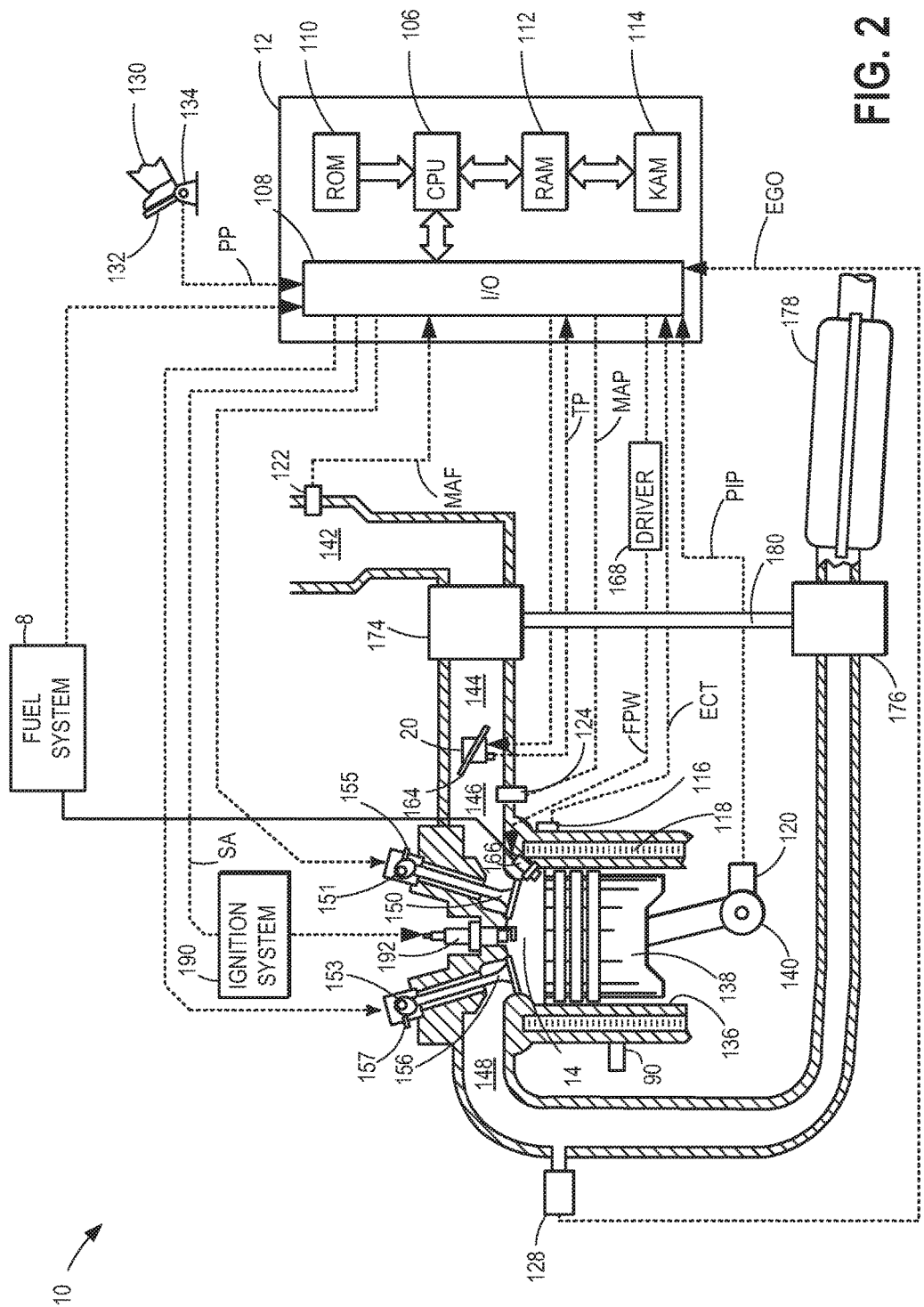
FIG. 2 shows a partial engine view.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT, as shown in FIG. 1), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 10 may further include a knock sensor 90 coupled to each cylinder 14 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder. In one example, based on the output of knock sensor 90 in a one or more defined windows (e.g., crank angle timing windows), abnormal combustion due to one or more of knock and pre-ignition may be detected and differentiated. As an example, pre-ignition may be indicated in response to knock sensor signals that are generated in an earlier window (e.g., before a cylinder spark event) while knock may be indicated in response to knock sensor signals that are generated in a later window (e.g., after the cylinder spark event). Further, pre-ignition may be indicated in response to knock sensor output signals that are larger (e.g., higher than a first threshold), and/or less frequent while knock may be indicated in response to knock sensor output signals that are smaller (e.g., higher than a second threshold, the second threshold lower than the first threshold) and/or more frequent.

In addition, a mitigating action applied may be adjusted based on whether the abnormal combustion was due to knock or pre-ignition. For example, knock may be addressed using spark retard and EGR while pre-ignition is addressed using cylinder enrichment, cylinder enleanment, engine load limiting, and/or delivery of cooled external EGR. The pre-ignition mitigating actions may be further adjusted, as elaborated at FIG. 4, based on whether the indication of pre-ignition was received while operating in the blow-through mode or the non blow-through mode. For example, while pre-ignition in both modes is addressed by enriching the engine, engine load limiting may be performed via valve overlap adjustments when in the blow-through mode while engine load limiting in the non blow-through mode is performed via intake throttle adjustments. Specifically, positive valve overlap may be reduced. In addition, the enrichment applied (degree of richness, duration of enrichment, number of cylinders enriched) may also be adjusted based on the operating mode where pre-ignition was detected.

Further still, distinct abnormal combustion counters may be used for counting pre-ignition events when in the blow-through mode versus the non blow-through mode. As an example, pre-ignition events in the blow-through mode may be counted on a first counter and pre-ignition mitigating actions may be enabled when the output of the first counter is higher than a first threshold. In comparison, pre-ignition events in the non blow-through mode may be counted on a second counter and pre-ignition mitigating actions may be enabled when the output of the second counter is higher than a second threshold. Herein, the first threshold may be the same as the second threshold, or different (e.g., higher or lower) than the second threshold. Further, a pre-ignition event in the blow-through mode may lead to the first counter being incremented but not the second counter, and likewise, a pre-ignition event in the non blow-through mode may lead to the second counter being incremented but not the first counter. As elaborated herein, mitigating actions, including an enrichment amount, a number of cycles enrichment deployed, and an amount of engine load limiting may be different in blow-through and non blow-through modes.

Returning to FIG. 1, Controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from knock sensor 90 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. Example routines are shown with reference to FIGS. 3-4.

In this way, the systems of FIGS. 1-2 enable a method for a boosted engine wherein while operating in a blow-through mode, positive valve overlap is reduced in response to an indication of pre-ignition. By adjusting the position of a VCT device to adjust an intake and/or exhaust valve timing, positive valve overlap may be temporarily reduced to limit engine load in the blow-through mode. At the same time, cylinder enrichment may be used alongside the load limiting to address the pre-ignition. Thereafter, positive valve overlap may be increased and blow-through operations may be resumed.

It will be appreciated that while the present example is described with reference to a boosted engine having blow-through capabilities, the adjusting of pre-ignition thresholds, pre-ignition mitigating fuel richness values, engine load limiting values, increment rates, decrements rates, etc., may be calibrated in other embodiments so that it works optimally for a particular engine, powertrain, and/or vehicle combination.

Now turning to FIG. 3, an example method 300 is shown for operating an engine in a blow-through mode wherein blow-through air is provided from an intake manifold to an exhaust manifold via engine cylinders using positive valve overlap. Alternatively, the engine is operated in a non blow-through mode without the use of valve overlap. Based on the mode of operation, in response to an indication of pre-ignition, different pre-ignition counters may be incremented and different pre-ignition mitigating actions may be taken. The different pre-ignition mitigating actions are discussed at method 400 of FIG. 4.

At 302, the method includes estimating and/or measuring engine operating conditions. These may include, for example, operator torque demand, engine speed, torque output, exhaust temperature, exhaust catalyst temperature, turbine speed, intake manifold pressure (MAP), boost pressure, barometric pressure (BP), exhaust manifold pressure, pedal position, vehicle speed, etc. At 304, based on the current engine operating conditions and the driver demanded torque, it may be determined if blow-through is desired. If blow-through is desired, it may be determined that blow-through conditions have been met. In one example, blow-through conditions may be met in response to a tip-in event. In another example, blow-through conditions may be met in response to a turbine speed being lower than a threshold at the time of the tip-in. Herein, compressed intake air may be blown through and directed from the intake manifold to the exhaust manifold to spin-up the turbine and increase turbine speed and engine boost.

Confirming blow-through conditions may further include confirming that intake manifold pressure (MAP) is higher than an exhaust manifold pressure. That is, a positive pumping regime may be confirmed. As such, there may be errors in the estimation of MAP and exhaust manifold pressure. For example, the estimated values of MAP and exhaust manifold pressure may be 50 inHg and 48 inHg respectively, allowing for a positive pumping regime and allowing for blow-through air to be directed from the intake manifold to the exhaust manifold. However, the actual values of MAP and exhaust manifold pressure may be 48 inHg and 50 inHg respectively. This would cause air and exhaust gas to actually flow in an opposite direction, from the exhaust manifold to the intake manifold.

To reduce such errors, a dead-band may be including when comparing MAP to exhaust manifold pressure (EXH-MAP). For example, to confirm that blow-through conditions are met, it may be confirmed that MAP is higher than exhaust manifold pressure by at least a threshold amount (e.g., MAP>EXHMAP+X). In comparison, to enable EGR (which is a flow in the opposite direction from the exhaust manifold to the intake manifold), it may be confirmed that exhaust manifold pressure is higher than MAP by at least a threshold amount (e.g., EXHMAP>MAP+Y). By including dead-bands when comparing intake and exhaust manifold pressures, tolerance for variation in measurement or estimation of intake and exhaust manifold pressures is provided.

If blow-through conditions are confirmed, at 306, the routine includes operating the engine in a blow-through mode. For example, in response to an operator pedal tip-in, the engine may be operated in a blow-through mode. Operating in the blow-through mode includes, at 308, determining an amount of blow-through air required based at least on one or more of rate of change of boost, mass air flow rate, engine speed and the turbine speed. For example, as a difference between the current turbine speed and a threshold speed increases, a larger amount of blow-through air may be required to spin-up the turbine. Operating in the blow-through mode further includes, at 310, determining a valve timing required to provide the desired amount of blow-through air via positive valve overlap. For example, the valve timing may be currently at a first valve timing that corresponds to no positive valve overlap or lower positive valve overlap. The controller may be configured to determine a second valve timing corresponding to higher positive overlap (e.g., full or maximum positive valve overlap). In addition, the controller may determine a variable cam timing (VCT) adjustment required to shift the valve timing from the initial valve timing to the final valve timing corresponding to increased positive valve overlap so that the determined amount of blow-through air can be provided through the cylinders. The determined VCT adjustment may include a camshaft position adjustment for the intake valve and/or the exhaust valve. In this way, the amount of positive valve overlap provided may be based on operating conditions such as operator torque demand and turbine speed. It will be appreciated that the positive valve overlap may be provided in the engine cylinder(s) undergoing cylinder combustion at the time of blow-through operation.

Next, at 312, operating in the blow-through mode includes adjusting the variable cam timing device to shift a camshaft position, thereby adjusting an intake and/or exhaust valve timing of the engine cylinder(s) from a first valve timing corresponding to no positive valve overlap (or lower positive valve overlap) to a second valve timing corresponding to positive intake valve to exhaust valve overlap (or increased positive valve overlap). Then, once the valve timing has been adjusted, intake air may be directed from the intake manifold, downstream of a compressor, to the exhaust manifold, upstream of a turbine, via positive overlap through the one or more engine cylinder(s). In addition, during the directing, a fuel injection amount may be adjusted based on the amount of air directed via positive valve overlap so as to maintain an exhaust air-to-fuel ratio at or around stoichiometry. For example, during the directing, cylinder fuel injection may be temporarily shifted to a richer fuel injection, wherein a degree of richness of the rich fuel injection is based on the amount of air directed as blow-through air via the cylinders using positive valve overlap. By adjusting the cylinder fuel injection during the directing based on the amount of blow-through air, exhaust conditions and the performance of an exhaust catalyst can be maintained.

At 314, it may be determined if there is an indication of pre-ignition. For example, it may be determined if the output of a knock sensor, estimated in a pre-ignition window, is higher than a pre-ignition threshold. As such, it may be determined if there is an indication of pre-ignition in any engine cylinder. The pre-ignition window may be earlier than a knock window, the pre-ignition threshold higher than a knock threshold. If no indication of pre-ignition is received, the routine may end with engine operation in the blow-through mode continued.

As such, operation in the blow-through mode with directing of compressed intake air from the intake manifold to the exhaust manifold via positive valve overlap may be performed until a turbine speed reaches a threshold speed. If the turbine has spun-up sufficiently, the initial valve timing corresponding to negative valve overlap (or lower positive valve overlap) may be resumed. Specifically, after the desired amount of blow-through air has been provided via positive valve overlap, the camshaft may be shifted back to the original position. In one example, the camshaft adjustment may return the valve timing from the second valve timing to the first valve timing. Valve timing may be adjusted to resume a position of no positive valve overlap while shifting the engine to a non blow-through mode of operation. In this way, by providing at least a portion of the required amount of blow-through air via positive valve overlap, turbine spin-up can be expedited without shifting a valve timing to a timing that degrades engine performance and reduces fuel economy.

If an indication of pre-ignition is confirmed while operating in the blow-through mode, at 316, a first pre-ignition count is incremented on a first counter of the controller in response to the indication of pre-ignition. As such, the first counter may be different and distinct from a second counter that is incremented in response to an indication of pre-ignition received while operating in the non blow-through mode. Thus, in response to the indication of pre-ignition received while in the blow-through mode, the first counter is incremented and the second counter is maintained (not incremented).

At 318, a pre-ignition mitigating action is adjusted based on the first pre-ignition count on the first counter. As elaborated at FIG. 4, this includes limiting an engine load by reducing positive valve overlap in response to the indication of pre-ignition while operating in the blow-through mode. The reducing valve overlap may be performed in response to the pre-ignition count on the first counter being higher than a (first) threshold.

Returning to 304, if blow-through conditions are not confirmed, at 320, the routine includes operating the engine in a non blow-through mode. In one example, when operating in the non blow-through mode, the camshaft position is adjusted so that no positive valve overlap is provided. For example, the position providing no positive valve overlap may be a default position of the camshaft. However, in other examples, when operating in the non blow-through mode, non-zero positive valve overlap may be provided and valve overlap may be reduced such that blow through is negligible.

At 322, after shifting to the non blow-through mode, it may be determined if an indication of pre-ignition has been received in any engine cylinder. For example, it may be determined if the output of a knock sensor, estimated in a pre-ignition window, is higher than a pre-ignition threshold. If no indication of pre-ignition is received, the routine may end with engine operation in the non blow-through mode maintained.

If an indication of pre-ignition is confirmed while operating in the non blow-through mode, at 324 a second pre-ignition count is incremented on a second counter of the controller in response to the indication of pre-ignition. As such, the second counter may be different and distinct from the first counter that is incremented in response to an indication of pre-ignition received while operating in the blow-through mode. Thus, in response to the indication of pre-ignition received while in the non blow-through mode, the second counter is incremented and the first counter is maintained (not incremented).

At 326, a pre-ignition mitigating action is adjusted based on the second pre-ignition count on the second counter. As elaborated at FIG. 4, this includes limiting an engine load by reducing an intake throttle opening (or adjusting a wastegate position) in response to the indication of pre-ignition while operating in the non blow-through mode. The reducing of the intake throttle opening or the increasing of a wastegate opening may be performed in response to the pre-ignition count on the second counter being higher than a (second) threshold.

Figure 4:
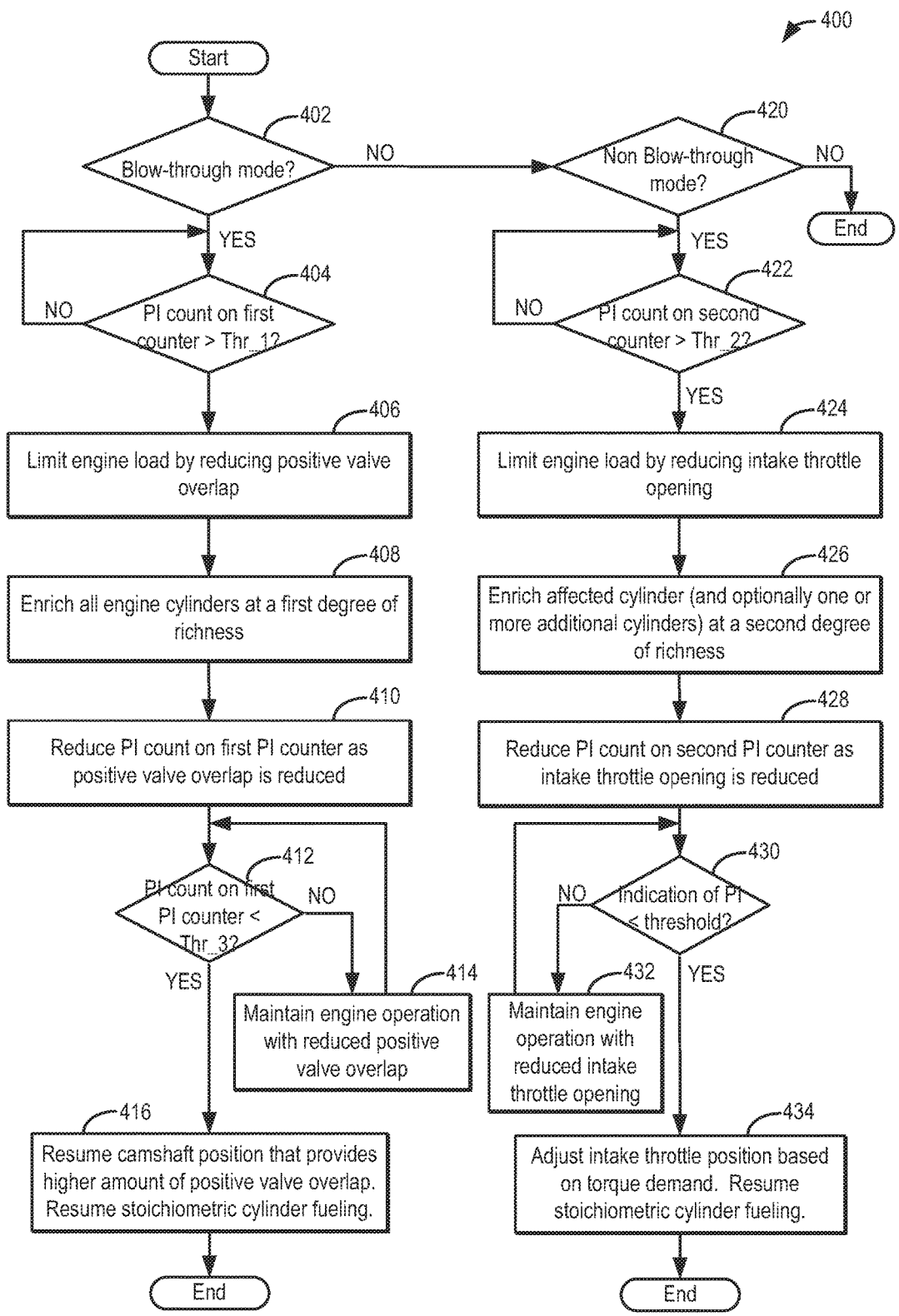
FIG. 4 shows a high level flow chart for addressing pre-ignition in the blow-through mode relative to a non blow-through mode.

As elaborated at FIG. 4, mitigating actions performed in response to pre-ignition in the blow-through mode may be triggered differently (e.g., at different thresholds) relative to the mitigating actions performed in response to pre-ignition in the non blow-through mode. In addition, the mitigating actions may also be distinct. For example, while pre-ignition in the blow-through mode is addressed by limiting an engine load via positive valve overlap adjustments, pre-ignition in the non blow-through mode may be addressed by limiting an engine load via intake throttle or wastegate position adjustments. In addition, the extent of fuel enrichment applied to mitigate pre-ignition may vary in the two modes.

Now turning to FIG. 4, an example method 400 is shown for adjusting pre-ignition mitigation actions performed while operating in a blow-through mode relative to a non blow-through mode.

At 402, it may be confirmed that the engine is operating in the blow-through mode. The blow-through mode may also be referred to as an optimum performance sustained scavenging (OPSS) mode. For example, it may be confirmed that the engine is operating with at least some positive valve overlap and with intake air directed from the intake manifold to the exhaust manifold via one or more engine cylinders. Upon confirmation, at 404, it may be determined if the (first) pre-ignition count on the first counter is higher than a first threshold (Thr_1). In one example, a larger number of pre-ignition events may be tolerated while operating in the blow-through mode allowing for a higher threshold to be used. In other examples, as elaborated below, the pre-ignition mitigation may be adjusted so that the number of enrichment cycles, and degree of enrichment may be less for an equal number of detection events while in the blow-through mode (relative to the non blow-through mode). If the pre-ignition count is not higher than the first threshold, the routine may continue to monitor pre-ignition events occurring during the blow-through mode and increment the first counter if any pre-ignition events are indicated.

If the output of the first counter exceeds the first threshold, at 406, the routine includes reducing valve overlap to limit the engine load. Reducing valve overlap includes operating with relatively lower positive valve overlap, or no positive valve overlap. Specifically, based on the pre-ignition count, the intake and exhaust cam or valve timings may be adjusted to temporarily reduce the amount of positive valve overlap. As such, in response to the indication of pre-ignition in any engine cylinder, the controller may adjust a variable cam timing device to adjust the intake and/or exhaust valve timing of all engine cylinders to reduce the positive valve overlap. With reference to the example of FIG. 3, the controller may adjust the VCT device to adjust the intake and/or exhaust valve timing of all engine cylinders from the second valve timing corresponding to (full) positive intake to exhaust valve overlap to or towards the first timing corresponding to no valve overlap. The amount of reduction in positive valve overlap applied may be based on the indication of pre-ignition (e.g., the pre-ignition count, the pre-ignition intensity, etc.). For example, the amount of reduction in positive valve overlap applied may be increased (e.g., gradually) as the indication of pre-ignition increases (e.g., as the pre-ignition count of the first counter exceeds the first threshold and/or as the pre-ignition intensity increases). By transiently reducing the positive valve overlap, and reducing the amount of air directed to the exhaust catalyst, further pre-ignition events are mitigated. In addition, catalyst overheating and thermal degradation is reduced.

Figure 5:
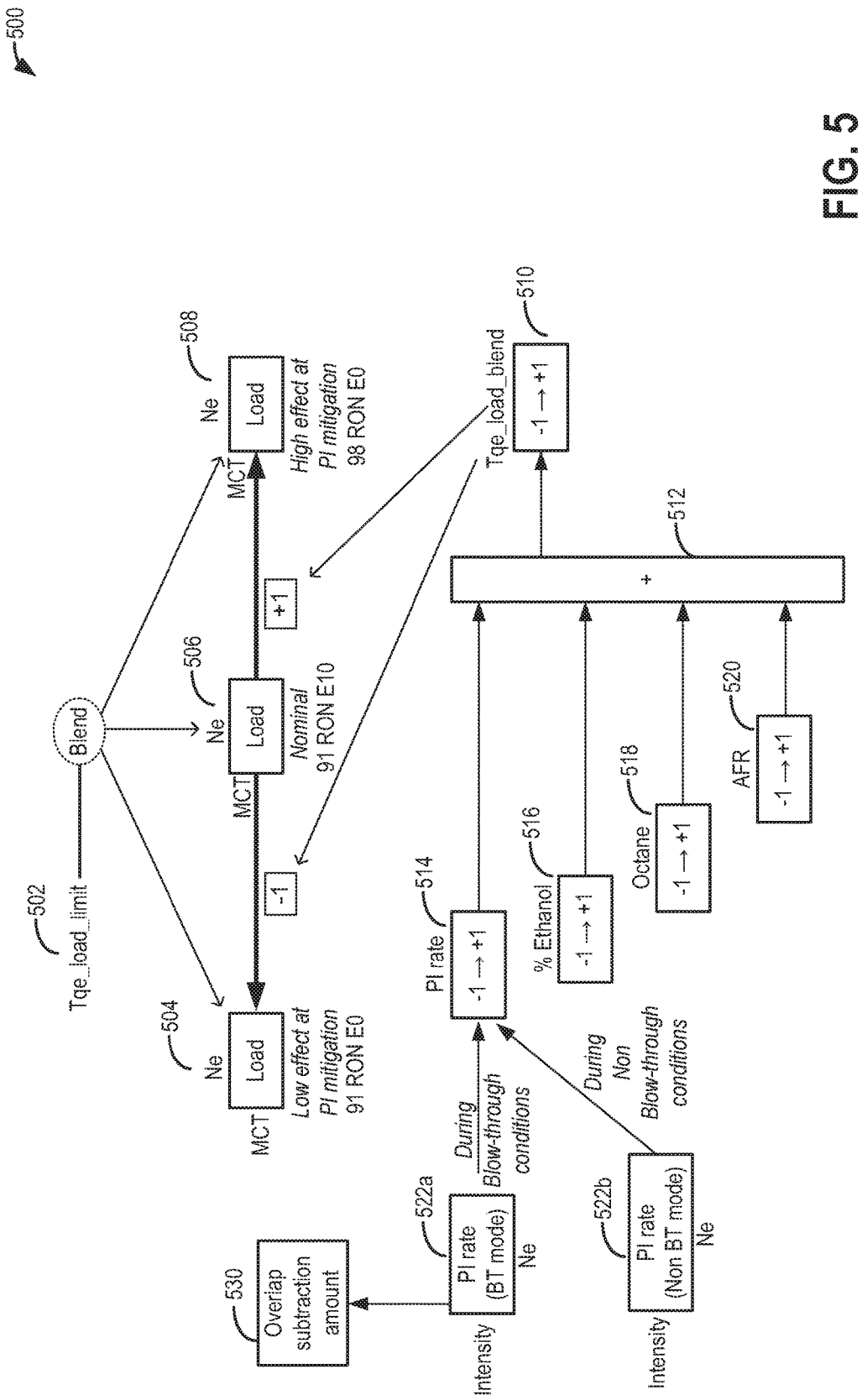
FIGS. 5-7 show block diagrams depicting adjusting of engine load-limiting during engine operation in blow-through and non blow-through modes.
Figure 6:
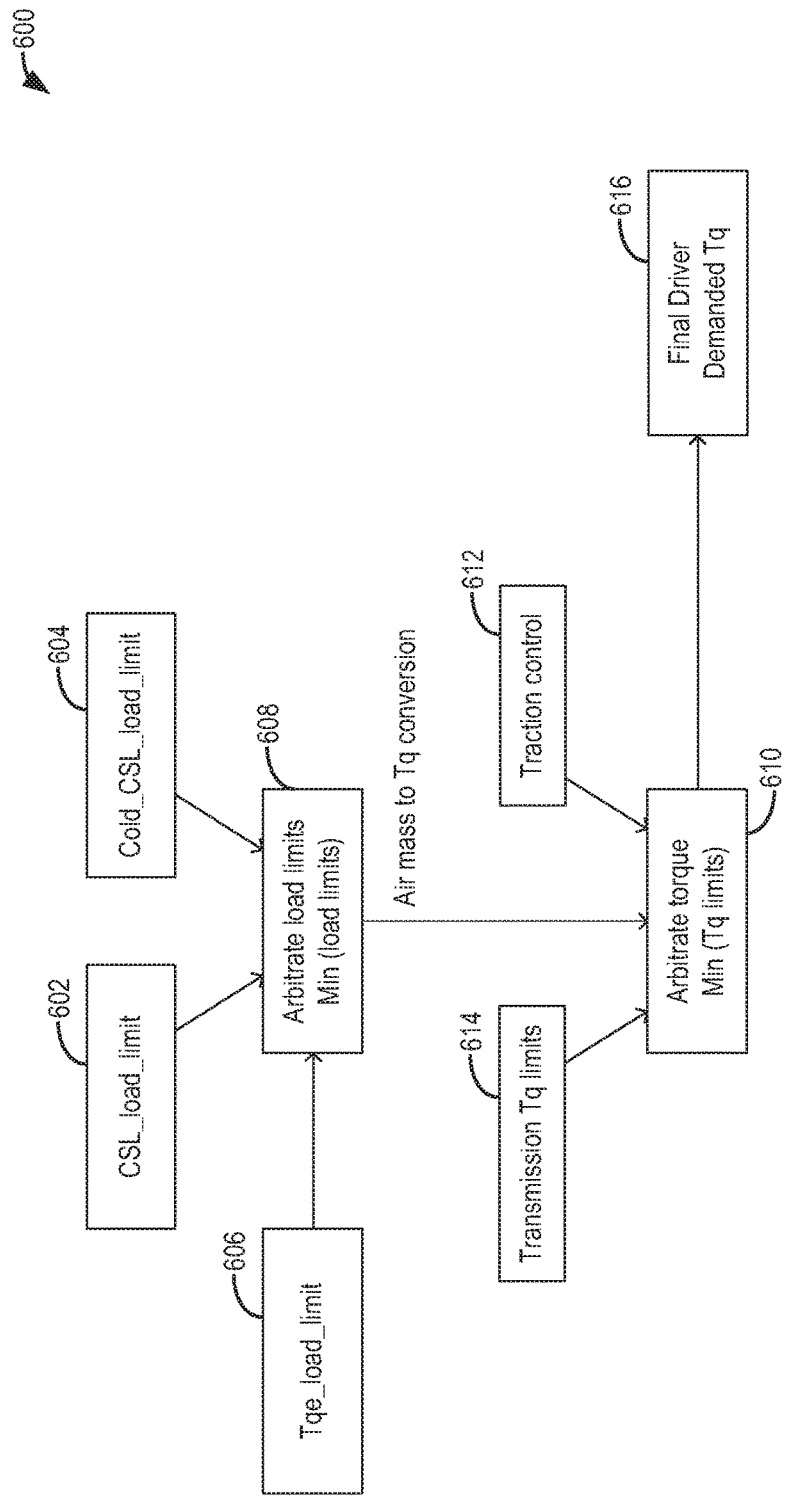

Optionally, while reducing the engine load, in response to the first pre-ignition count being higher than the first threshold, the engine may be enriched. Specifically, all the engine cylinders may be enriched by a first amount, the degree of richness based on the first pre-ignition count. For example, as the first pre-ignition count exceeds the first threshold, the degree of richness of the engine enrichment may be increased. FIGS. 5-7 show a detailed overview of engine load limiting and pre-ignition mitigating enrichment applied in response to pre-ignition during the blow-through mode.

At 410, in response to the reducing valve overlap, the first pre-ignition count on the first pre-ignition (PI) counter may be decreased. For example, the first pre-ignition count may be decreased at a first rate. In particular, reducing the valve overlap may lead to a drop in pre-ignition occurrence, and the first PI counter may be decremented in response to no further occurrence of pre-ignition events while continuing to operate in the blow-through mode. The counter may be decremented each time no episodes of pre-ignition occur over a defined duration of blow-through mode of operation. As such, when positive valve overlap is reduced, pre-ignition occurrence becomes less likely and so it would be longer for another pre-ignition event to occur. At 412, it may be determined if the first pre-ignition count is below a lower threshold (Thr_3). If not, the routine may maintain engine operation with reduced positive valve overlap at 414. Else, if the first pre-ignition count is below the lower threshold, it may be determined that the likelihood of further pre-ignition is sufficiently low, and further operation with valve overlap reduction is not required. Accordingly, at 416, while blow-through conditions are still prevalent, the camshaft position corresponding to increased positive valve overlap may be resumed. For example, the VCT device may be adjusted to shift the camshaft and return the intake and/or exhaust valve timing of all engine cylinders to the second valve timing corresponding to (full) positive intake to exhaust valve overlap. As such, if blow-through conditions are not present by the time the first pre-ignition count has sufficiently reduced, the engine may resume operation in the non blow-through mode. Alternatively, as the output of the first PI counter is decremented in response to no episodes of PI occurrence in the blow-through mode (following the reducing of the valve overlap), the VCT device may be adjusted to correspondingly increase the positive valve overlap to gradually reduce the engine load limiting. Thus, as the PI count on the first counter decrements, engine operation with full positive valve overlap may be resumed. In this way, it may be possible to space the pre-ignition events out in the blow-through mode, by use of the count up and count down rate on the pre-ignition counter, since the pre-ignition count ultimately affects how long the engine spends in full or reduced overlap mode.

Returning to 402, if the blow-through mode is not confirmed, at 420, engine operation in the non blow-through mode may be confirmed. Upon confirmation, at 422, it may be determined if the second pre-ignition count on the second counter is higher than a second threshold (Thr_2). The second threshold may be lower than the first threshold. In one example, a smaller number of pre-ignition events may be tolerated while operating in the non blow-through mode allowing for a lower threshold to be used. For example, in the blow-through mode, a larger number of pre-ignition events may be allowed before a mitigating action is taken. In comparison, in the non blow-through mode, a smaller number of pre-ignition events may be tolerated before action is taken. Further still, for an equal number of events in either mode, the mitigating action performed may be less severe (e.g., less degree of richness in the mitigating enrichment) when in the blow-through mode relative to the non blow-through mode. If the pre-ignition count is not higher than the second threshold, the routine may continue to monitor pre-ignition events occurring during the non blow-through mode and increment the second counter if any pre-ignition events are indicated.

If the output of the second counter exceeds the second threshold, at 424, the routine includes reducing an intake throttle opening to limit the engine load. Reducing intake throttle opening includes transiently moving the throttle towards a more closed position. The amount of reduction in intake throttle opening applied may be based on the indication of pre-ignition (e.g., the pre-ignition count, the pre-ignition intensity, etc.). For example, the intake throttle opening may be decreased further as the indication of pre-ignition increases (e.g., as the pre-ignition count of the second counter exceeds the second threshold and/or as the pre-ignition intensity increases). By transiently reducing the intake throttle opening, engine load is reduced, further pre-ignition events are mitigated.

It will be appreciated that while the depicted routine shows engine load limiting in response to pre-ignition during the non blow-through mode via intake throttle adjustments, in further examples, engine load limiting may be alternatively or additionally achieved via wastegate position adjustments. For example, the wastegate position may be adjusted to reduce the wastegate closing (and increase the wastegate opening) in response to the indication of pre-ignition in the non blow-through mode. As such, by increasing the wastegate opening, boost pressure and engine load is reduced.

Also, at 426, while reducing the engine load, in response to the second pre-ignition count being higher than the second threshold, the engine may be enriched. Specifically, one or more engine cylinders, such as the pre-ignition affected cylinder and one or more additional engine cylinders, may be enriched by a second amount, the degree of richness based on the second pre-ignition count. For example, as the second pre-ignition count exceeds the second threshold, the degree of richness of the engine enrichment may be increased. The second amount of enrichment applied in response to pre-ignition in the non blow-through mode may be higher than the first amount of enrichment applied in response to pre-ignition in the blow-through mode.

At 428, in response to the reducing of the engine load by decreasing the intake throttle opening and/or increasing the wastegate opening, the second pre-ignition count on the second pre-ignition counter may be decreased. As such, when the engine load is limited, further pre-ignition is less likely to occur and a longer duration may elapse before another occurrence of pre-ignition. For example, the second pre-ignition count may be decreased at a second rate that is slower than the first rate at which the first pre-ignition count is decreased on the first counter. Alternatively, as the output of the second PI counter is decremented in response to no episodes of PI occurrence in the non blow-through mode (following the reducing of the intake throttle opening), the intake throttle may be adjusted to correspondingly increase the engine load. As such, as the PI count on the second counter decrements, engine operation with greater engine load and higher throttle opening may be resumed, increasing engine torque delivery.

In further representations, the rate may depend on how often pre-ignition occurs, and which mode the engine is being operated in. As an example, in the blow-through mode, the counter may be decremented if no episodes of pre-ignition occur. In comparison, if the engine is not operating in the blow-though mode, the counter may be frozen at the last value and not decremented if no episodes occur. Thus, the first pre-ignition count may be reduced in response to no occurrence of pre-ignition following the engine load limiting via valve overlap adjustments, and as the first pre-ignition count is reduced, the engine load limiting may be reduced by increasing the valve overlap. In comparison, the second pre-ignition count may be reduced in response to no occurrence of pre-ignition following the engine load limiting via intake throttle or wastegate position adjustments, and as the second pre-ignition count is reduced, the engine load limiting is reduced by increasing throttle opening or decreasing wastegate opening.

It will be appreciated that when switching between blow-through and non blow through modes, engine load adjustments may be made. For example, the engine load may need to ramped in (e.g., when transitioning into a blow-through mode) or ramped out (e.g., when transitioning into a non blow-through mode). During the transition, the load may be ramped to the next value over a period of time so torque disturbances and transients are reduced, and a torque bump is not experienced.

At 430, it may be determined if the indication of pre-ignition is below a threshold, for example, if pre-ignition is sufficiently abated. Alternatively, it may be determined if the second pre-ignition count is below a lower threshold (which may be the same or different from lower threshold Thr_3). If not, the routine may maintain engine operation with engine load limited via reduced intake throttle opening at 432. Else, if the indication of pre-ignition is sufficiently low (or the second pre-ignition count is below the lower threshold), it may be determined that the likelihood of further pre-ignition is sufficiently low, and further operation with engine load limited is not required. Accordingly, at 434, the intake throttle opening may be increased based on the current operator torque demand.

In this way, in response to an indication of pre-ignition received while operating in a first blow-through mode, a controller may increment a first pre-ignition count on a first counter, and limit an engine load via valve overlap adjustments based on the first pre-ignition count. In comparison, in response to an indication of pre-ignition received while operating in a second non blow-through mode, the controller may increment a second pre-ignition count on a second counter, and limit an engine load via intake throttle adjustments based on the second pre-ignition count. Herein, incrementing the first pre-ignition count on the first counter while operating in the first blow-through mode includes not incrementing the second pre-ignition count on the second counter, and incrementing the second pre-ignition count on the second counter while operating in the second non blow-through mode includes not incrementing the first pre-ignition count on the first counter. Limiting the engine load based on the first pre-ignition count includes limiting based on the first pre-ignition count being higher than a first threshold, and wherein limiting based on the second pre-ignition count includes based on the second pre-ignition count being higher than a second threshold, the second threshold lower than the first threshold.

As used herein, operating in the first blow-through mode includes operating with positive intake to exhaust valve overlap, and limiting the engine load via valve overlap adjustments includes reducing the positive valve overlap. In comparison, limiting the engine load while operating in the second non blow-through mode via intake throttle adjustments includes reducing an opening of the intake throttle.

The controller may further enrich all engine cylinders at a first degree of richness in response to the first pre-ignition count being higher than the first threshold, and enrich one or more engine cylinders at a second degree of richness in response to the second pre-ignition count being higher than the second threshold, the second degree of richness higher than the first degree of richness. Further, during the first blow-through mode, the controller may reduce the first pre-ignition count on the first counter at a first rate while reducing the positive valve overlap, while during the second non blow-through mode, the controller may reduce the second pre-ignition count on the second counter at a second rate while reducing the intake throttle opening, the second rate slower than the first rate.

Now turning to FIGS. 5-7, schematic depictions of an engine load limiting routine is shown. The engine load limiting is performed responsive to a knock sensor output intensity in a pre-ignition window, and further based on whether the indication of pre-ignition was received during a blow-through or non blow-through mode of operation. A cylinder enrichment and an amount of engine load limiting for pre-ignition in each mode is determined based on the pre-ignition intensity. The load limiting may be adjusted as a function of the determined cylinder enrichment routine such as that load limit of the engine is increased as the determined enrichment increases. As such, this may be performed as a parallel evaluation based on the output of a look-up table. Therein, if the number of enrichment cycles is determined to be higher than a threshold (e.g., higher than 0), it triggers adjustments including enrichment and spark advance. The output of a rate incrementer is then used to determine load limiting. For example, if the output of the rate incrementer is higher than a threshold (e.g., higher than 0), it triggers adjustments including load limiting. Likewise, as the output of the rate incrementer is decremented, the load limiting applied may be decreased (and engine load and torque output may be correspondingly increased).

Turning to FIG. 5, the routine 500 may start with a load limit 502 (Tqe_load_limit) determined in a feed-forward manner. Load limit 502 is determined based on engine operating conditions, such as based on an engine speed-load conditions. Load limit 502 may then be clipped based on various factors so as to minimize negative NVH issues associated with abnormal combustion, such as those associated with low speed pre-ignition events.

The controller may use three sets of tables including a nominal table 506 based on nominal conditions, a high effectiveness table 508 (which has a higher effect on abnormal combustion mitigation and generates higher torque output), and a low effectiveness table 504 (which has a lower effect on abnormal combustion and generates a lower torque output). Each of tables 504, 506, and 508 is plotted as a function of manifold charge temperature (MCT) and engine speed (Ne), and the output of each table is a load clip. Load limit 502 is then clipped with a load clip, to blend the outputs of tables 504-508.

Specifically, a multiplication factor 510 (or Tqe_load_blend) is used to adjust the load clips output from tables 504-508 and interpolate between the low, nominal, and high effectiveness tables. Multiplication factor 510 ranges from −1 to 1. The factor may be based on various feed-forward measurements and is further based on whether the engine is operating in a blow-through mode or in a non blow-through mode. For example, the factor may be based on fuel ethanol or alcohol content at 516, fuel octane content at 518, and air-to-fuel ratio (AFR) at 520. Thus, a lean air-to-fuel ratio or a low octane fuel that will make the probability of abnormal combustion go higher results in a load clip wherein the interpolation of the load clip moves the load limit to a lower value (such as towards the load clip of lower effectiveness table 504). In another example, a rich air-to-fuel ratio or a high octane content of the fuel may result in a higher load limit (such as towards the load clip of higher effectiveness table 508) since the enrichment reduces the probability of abnormal combustion. The load clip is also based on a rate of abnormal combustion, such as a rate of pre-ignition (herein also referred to as PI rate 514). PI rate 514 may be learned as a function of knock sensor output intensity and engine speed and may be incremented differently on distinct PI counters based on whether the incidence of PI occurred during blow-through conditions or non blow-through conditions.

For example, incidences of pre-ignition occurring during blow-through conditions may be used to increment a first PI counter and adjust a first PI rate table 522a. Then, during the blow-through mode of operation, the output of first PI rate table 522a may be used as an input for interpolating tables 504-508. Likewise, incidences of pre-ignition occurring during non blow-through conditions may be used to increment a second, different PI counter and adjust a second PI rate table 522b. Then, during the non blow-through mode of operation, the output of second PI rate table 522b may be used as an input for interpolating tables 504-508.

The incrementing of the first PI rate table 522a may occur at a different rate than that of the second PI rate table 522b. For example, the first table 522a may be incremented faster than the second table 522b. As a duration of engine operation with no incidence of pre-ignition ensues, the counters may be decremented at different rates of decrementing. For example, the first table 522a may be decremented faster than the second table 522b.

In further embodiments, the output of the first PI rate table 522a may be used as an input during blow-through conditions to determine a subtraction amount of overlap 530. The subtraction amount of overlap 530 may correspond to the reduction in positive valve overlap required to transiently load limit the engine in response to an indication pre-ignition during the blow-through mode. Therein, as the output of PI rate table 522a increases in response to pre-ignition incidences, the subtraction amount would be increased with more positive valve overlap reduction. Once the positive valve overlap 530 is reduced to a limit (e.g., once the subtraction amount is at a threshold amount, such as at an amount corresponding to no positive valve overlap), additional pre-ignition events and a further increase in the output of PI rate table 522a may be used to perform load limiting and interpolation of tables 504-508.

The load clip also includes the feedback portion of the load limiting, wherein the load limit is further adjusted based on PI rate 514. Therein, the PI rate may be incremented on a rate counter based on engine speed and knock sensor output intensity. The rate counter or weighting is incremented as the degree of enrichment or number of enriches cycles applied in response to the output of a knock sensor in a defined window (e.g., the first window of FIGS. 2-4) increases, and further based on an engine speed at which the knock sensor signal is detected. As the number of abnormal combustion events per vehicle miles driven increases, the rate may be further incremented. The rate may be decreased as the number of miles driven by the vehicle engine increases. As such, with enough miles, the rate can come back to zero and have no effect on load limiting if no abnormal combustion is observed. However, the operating conditions can affect the anticipation of abnormal combustion and hence the nominal load limit. The torque load limit is then arbitrated with the load clip by controller 512 to determine the arbitrated torque load limit 510.

In parallel, a rate incrementer may be counting the number of enrichment cycles performed in response to an abnormal combustion event during each of the blow-through and non blow-through mode. The number of enrichment cycles may be determined as a function of an output intensity of a knock sensor in the defined first window and an engine speed at which the knock sensor output is received, and further based on whether pre-ignition occurred during blow-through conditions or not. For example, as the knock sensor output intensity in the defined window increases, the number of enrichment cycles may be increased and the rate incrementer may be incremented by a defined amount. Alternatively, a weighting factor may be determined. If the rate incrementer output is high (e.g., higher than a threshold), or if the weighting factor is high (e.g., higher than a threshold), a weighted engine load limit may be calculated. This weighted engine load limit may have a more aggressive "learn down rate" and may be activated only when a threshold number of enrichment cycles have been used. The incrementing and the weighting factor may be adjusted differently in the blow-through mode as compared to the non blow-through mode. For example, in the blow-through mode, the incrementing may be faster than the incrementing in the non blow-through mode. However, the enrichment applied during the non blow-through mode may have a higher degree of richness than in the blow-through mode.

An example of such a rate incrementer is shown at map 700 of FIG. 7. Specifically, first enrichment table 702a determines a number of enrichment cycles to be performed as a function of the output intensity of the knock sensor in the first window and an engine speed at which the knock sensor output is received when operating in the blow-through mode. The first enrichment table 702a may also receive input from first PI rate table 522a. Likewise, second enrichment table 702b may determine a number of enrichment cycles to be performed as a function of the output intensity of the knock sensor in the first window and an engine speed at which the knock sensor output is received when operating in the non blow-through mode. The second enrichment table 702b may also receive input from second PI rate table 522b. At 704 it is determined if the number of enrichment cycles is higher than a threshold (e.g., higher than 0 is the depicted example). If no, the engine may continue running with the normal fuel strategy at 706. For example, the engine cylinders may continue to be operated at stoichiometry. Else, if the number of enrichment cycles determined is higher, then air-fuel control for the abnormal combustion affected cylinders is adjusted at 708 so that the desired degree of richness can be provided.

Arbitration of torque load limits is shown at map 600 of FIG. 6. A controller may first determine torque load limits under different conditions. This includes a combustion stability limited load limit 602 (CSL_load_limit), a cold condition combustion stability limited load limit 604 (Cold_CSL_load_limit), as well as an interpolated torque load limit 606 (Tqe_load_limit). As such, the interpolated torque load limit 606 may correspond to the load clipped torque load limit determined at FIG. 5. At 608, a controller may arbitrate the load limits and select the desired load limit to be the lowest (that is, minimum) of load limits 602-606.

The arbitrated load limit then undergoes air mass to torque conversion. In addition, other weighted engine load limits are learned. These include, for example, transmission torque limits 614 and traction control limits 612. At 610, the controller may arbitrate the torque limits and select the final driver demanded torque 616 to be the lowest (that is, minimum) of load limits 612, 614, and the air mass to torque converted arbitrated load limit.

Thus, the final driver demanded torque may be the lowest of the interpolated torque limit and the weighted engine torque limit. Herein, the weighted engine torque limit may be more restrictive than the arbitrated torque load limit, but may vary relative to each other based on engine speed. For example, at low engine speeds, where pre-ignition is likely to occur, the weighted engine load limit may be the most restrictive. In comparison, at higher engine speeds, such as when knock is likely to occur, the clipped torque load limit may be the most restrictive. By selecting the lowest of the possible load limits, abnormal combustion is mitigated and further mega-knock events are pre-empted while addressing all other load affecting constraints.

Now turning to FIG. 8, map 800 shows an example engine operation wherein turbo lag is reduced by directing intake air from downstream of a compressor in the intake manifold to upstream of a turbine via positive valve overlap. Further, pre-ignition is addressed differently based on whether the abnormal combustion occurred during a blow-through mode or a non blow-through mode. In the depicted example, the engine includes a variable cam timing (VCT) device for adjusting the cylinder valve timing. Specifically, map 800 depicts a change in turbine speed at plot 802, a change in camshaft position (or VCT adjustment) that adjusts a corresponding cylinder valve timing at plot 804, a change in engine air-to-fuel ratio (cylinder AFR) relative to stoichiometry at plot 806, a knock sensor output indicative of pre-ignition (PI) at plot 808, the output of a first and second PI counter at plots 810-812, and an intake throttle position at plot 814.

In the current example, before t1, the engine may be operating with low boost. For example, the engine may be operating un-boosted or at a low boost level, as indicated by low turbine speeds at plot 802. At t1, an operator pedal tip event may occur. In response to the tip-in event, the controller may shift operation to a blow-through mode. Therein, the controller may be configured to direct compressed intake air from the intake manifold, downstream of a compressor, to the exhaust manifold, upstream of a turbine, to thereby provide additional mass flow and enthalpy to expedite turbine spin-up. As such, the compressed intake air that is blown-through, herein also referred to as blow-through air, may be provided through one or more engine cylinders operating with positive valve overlap, and wherein amounts of air directed via the cylinders is based on engine operating conditions.

Specifically, in response to the tip-in event, the controller may determine a total amount of blow-through air required to spin-up the turbine. The controller may then determine a camshaft adjustment required to shift the valve timing of a given cylinder (or one or more cylinders) from an initial timing of lower positive overlap to a final timing of higher positive valve overlap (e.g., an initial timing of negative valve overlap to a final timing of positive valve overlap). The controller may then adjust the camshaft (plot 804) to adjust the valve timing from the initial timing (before t1) to a final timing (at position 805). The controller may then hold the camshaft at the adjusted position so as to maintain the valve timing at position 805 between t1 and t2. This enables a portion of the required blow-through air to be provided via the cylinders using positive valve overlap. In addition, fueling of the cylinder(s) operating with positive valve overlap may be adjusted (e.g., enriched) based on the amount of blow-through air being delivered so as to maintain an overall combustion air-fuel ratio (AFR) at or around stoichiometry (plot 806).

While operating in the blow-through mode between t1 and t2, one or more indications of pre-ignition (PI) may be received based on the output of an engine knock sensor (plot 808) exceeding a PI threshold 809. In the depicted example, two indications are received between t1 and t2. Accordingly, in response to the indication of PI during the blow-through mode, a first PI counter 810 is incremented while a second PI counter 812 is maintained. However, between t1 and t2, the output count of the first PI counter may be below a blow-through mode upper threshold 820 and so no PI mitigating actions are performed.

At t2, the turbine speed may reach a threshold speed beyond which further blow-through air may not be required to assist in turbine spin-up. By providing blow-through air between t1 and t2, turbine spin-up is expedited. As such, in the absence of blow-through air, the turbine spin-up may have been slower and the threshold speed may have been attained after t2. In response to the turbine being sufficiently spun up, at t2, the camshaft may resume its initial position thereby bringing the valve timing back to the initial valve timing of lower positive valve overlap. As such, the engine may resume operation in a non blow-through mode at t2. In response to a shift to the non blow-through mode, the output of the first counter 810 may be frozen at t2.

At t2, in response to the non blow-through mode being entered, the second PI counter 812 is enabled. In particular, second PI counter 812 is decremented starting at t2 due to there being no incidence of pre-ignition. As such, the second PI counter continues to be decremented for a duration since t2 until an indication of pre-ignition is received. While operating in the non blow-through mode between t2 and t4, one or more indications of pre-ignition (PI) may be received based on the output of the engine knock sensor exceeding a PI threshold 809. In the depicted example, multiple indications are received between t2 and t3, closer to t3. Accordingly, in response to the indication of PI during the non blow-through mode, decrementing of the second PI counter is stopped and the second PI counter 812 is incremented while the first PI counter 810 is maintained. Also between t2 and t3, the incremented output of the second first PI counter may exceed a non blow-through mode upper threshold 822 and so PI mitigating actions may be initiated. Specifically, at t3, an intake throttle opening may be reduced (plot 814) to limit an engine load. In addition, the PI affected cylinder(s) may be temporarily enriched. The enrichment may be based on the intensity of the PI indication received between t2 and t3. As a result of the cylinder enrichment, an overall engine AFR may become slightly richer than stoichiometry (plot 806).

In response to the engine load limiting via reducing intake throttle opening, further occurrences of pre-ignition may drop. In response to no further occurrences of pre-ignition following the reducing of the intake throttle opening, the second PI counter 812 may be decremented. Specifically, the second PI counter may be gradually decremented as a duration of operation in the non blow-through mode without pre-ignition incidences continues. In addition, as the output of the second PI counter is decremented, engine load limiting is reduced, allowing higher engine load and torque outputs to be gradually resumed. In the depicted example, as the output of the second PI counter is decremented, the intake throttle opening is increased. In addition, cylinder enrichment is also correspondingly decreased in proportion to the decrementing of the second PI counter. When the decremented count on the second PI counter reaches non blow-through mode lower threshold 826, any remaining engine load limiting and cylinder enrichment is discontinued. Specifically, intake throttle opening is increased and engine AFR is returned to stoichiometry. The intake throttle opening may be increased based on the prevalent operator torque demand.

At t4, due to a change in engine operating conditions, turbine spin-up assistance may be required again. Accordingly, at t4, the engine may once again resume blow-through mode operation with the VCT adjusted to position 805 to provide positive intake to exhaust valve overlap. In response to the shift to the blow-through mode, the output of the second PI counter may be frozen and not decremented further. While operating in the blow-through mode between t4 and t5, one or more indications of pre-ignition (PI) may be received based on the output of the engine knock sensor exceeding a PI threshold 809. In the depicted example, multiple indications are received after t4. Accordingly, in response to the indication of PI during the blow-through mode, the first PI counter 810 is further incremented while the second PI counter 812 is maintained.

Herein, the incremented output of the first PI counter may exceed blow-through mode upper threshold 820 and so PI mitigating actions may be initiated. Specifically, between t4 and t5, when upper threshold 820 is exceeded, positive valve overlap is reduced to limit an engine load. Herein, the VCT is transiently returned to the original position of reduced valve overlap. In addition, all engine cylinders (that is, the PI affected cylinder and other PI unaffected cylinders) may be temporarily enriched. The enrichment may be based on the intensity of the PI indication received between t4 and t5. As a result of the enrichment, an overall engine AFR may temporarily become richer than stoichiometry.

Also between t4 and t5, in response to the engine load limiting via reducing valve overlap, further occurrences of pre-ignition may drop. In response to no further occurrences of pre-ignition following the reducing of valve overlap, the first PI counter 810 may be decremented. Specifically, the first PI counter may be gradually decremented as a duration of operation in the blow-through mode without pre-ignition incidences continues. The rate of decrementing the first PI counter in response to the engine load limiting via reducing valve overlap may be different (herein higher) than the rate of decrementing the second PI counter in response to the engine load limiting via reducing intake throttle opening. For example, the first PI counter may be decremented in response to no pre-ignition event occurring for a given duration (such as for a duration after t5 in the given example) while operating in the blow-through mode. In comparison, the second PI counter is not decremented, but frozen at the last value in response to no pre-ignition event occurring for the same given duration while operating in the non blow-through mode (as depicted after t3 in the given example). In addition, as the output of the first PI counter is decremented, engine load limiting is reduced, allowing higher engine load and torque outputs to be gradually resumed. In the depicted example, as the output of the first PI counter is decremented, the valve overlap is increased. In addition, cylinder enrichment is also correspondingly decreased in proportion to the decrementing of the first PI counter. When the decremented count on the first PI counter reaches blow-through mode lower threshold 824, any remaining engine load limiting and engine enrichment is discontinued. Specifically, positive valve overlap is increased and the VCT is returned to position 805. Also, engine combustion AFR is returned to stoichiometry. Blow-through operations are then resumed at t5 and continued until t6 when turbine speed is sufficiently high. At t6, blow-through mode is discontinued, VCT position is returned to the initiation position of no valve overlap, and non blow-through mode operations are resumed. In addition, the output of the first PI counter is frozen.

It will be appreciated that while the depicted example shows engine load limiting in response to pre-ignition during the non blow-through mode via intake throttle adjustments, in further examples, engine load limiting may be alternatively or additionally achieved via wastegate position adjustments. For example, the wastegate position may be adjusted to reduce the wastegate closing (or increase the wastegate opening) so as to reduce boost pressure and engine load.

In this way, pre-ignition is tracked and addressed differently when operating in blow-through mode relative to the non blow-through mode. By addressing PI in the blow-through mode at a higher threshold, and with a lower degree of enrichment and load limiting, engine performance in the blow-through mode is improved. In particular, PI is likely to happen more often in the blow-through mode as compared to the non blow-through mode. Thus, by applying different load limits in the blow-through operating range, as compared to outside this operating range, significant degradation of engine performance due to engine load limiting is reduced in an operating region where pre-ignition does not occur with such high frequency. Furthermore, the lower degree of pre-ignition mitigating enrichment applied during the blow-through mode offers better catalyst temperature management.

In one example, an engine system comprises an engine including one or more cylinders; an intake throttle; a turbocharger including an intake compressor driven by an exhaust turbine; an intake valve and an exhaust valve coupled to each engine cylinder; a variable cam timing device for adjusting a valve timing of one or more of the intake and the exhaust valve of each of the one or more cylinders; a knock sensor coupled to the engine for detecting abnormal cylinder combustion; a first blow-through mode pre-ignition counter; and a second non blow-through mode pre-ignition counter. The engine system further includes a controller with computer readable instructions stored on non-transitory memory for, in response to a tip-in, adjusting the variable cam timing device to vary intake and/or exhaust valve timing and operate the engine in a blow-through mode with full positive intake to exhaust valve overlap. Further, in response to an indication of pre-ignition received while operating in the blow-through mode, the controller may increment the first pre-ignition counter independent of the second pre-ignition counter and reduce the positive valve overlap as an output of the first pre-ignition counter exceeds an upper threshold. The engine system may further comprise a fuel injector coupled to each cylinder, wherein the controller includes further instructions for, enriching each engine cylinder responsive to the indication of pre-ignition, a degree of richness based on the indication of pre-ignition and the positive valve overlap. The controller may also decrement the output of the first pre-ignition counter as engine operation in the blow-through mode with no occurrence of PI occurs. The amount of positive valve overlap may then be incremented as the output of the PI counter decreases so as to gradually resume blow-through operations.

In still further representations, a method for addressing pre-ignition includes, while operating in a blow-through mode, in response to an indication of pre-ignition, incrementing a pre-ignition counter and reducing positive intake to exhaust valve overlap as an output of the pre-ignition counter increases. The method further includes, as a duration with no incidence of pre-ignition since the reducing of valve overlap increases, decrementing the pre-ignition counter and increasing valve overlap as the output of the pre-ignition counter decreases. Herein, the reducing of valve overlap is in proportion to the increase in the output of the pre-ignition counter. Likewise, the increasing of valve overlap is in proportion to the decrease in the output of the pre-ignition counter. For example, operating in the blow-through mode may include operating with full positive valve overlap. A subtraction amount may be determined based on the output of the pre-ignition counter. Thus, as the pre-ignition count increases or exceeds an upper threshold, the subtraction amount may be increased with a factor based on the output of the pre-ignition counter, and the valve overlap may be reduced from the position of full valve overlap (towards a position of no valve overlap) based on the subtraction amount. Likewise, as the pre-ignition count decreases or falls below a lower threshold, the subtraction amount may be decreased with a factor based on the output of the pre-ignition counter, and the valve overlap may be increased from the position of reduced valve overlap (e.g., from a position of no valve overlap) towards the position of full valve overlap based on the subtraction amount.

In a still further representation, in response to an indication of pre-ignition received in an engine cylinder while operating in a first blow-through mode, a controller may increment a first pre-ignition count on a first counter at a first rate while reducing positive valve overlap in the engine pre-ignition affected engine cylinder (and one or more other cylinders) and while enriching all engine cylinders based on the (increasing) first pre-ignition count. Then, in response to no further occurrence of pre-ignition while operating in the blow-through mode, the controller may decrement the pre-ignition count on the first counter at the first rate while increasing positive valve overlap and resuming stoichiometric cylinder combustion based on the (decreasing) first pre-ignition count. In comparison, in response to an indication of pre-ignition received in an engine cylinder while operating in a second non blow-through mode, the controller may increment a second pre-ignition count on a second counter at a second rate while reducing an exhaust wastegate closing (or intake throttle opening) and enriching the pre-ignition affected cylinder (and one or more other cylinders) based on the second pre-ignition count. Then, in response to no further occurrence of pre-ignition while operating in the non blow-through mode, the controller may decrement the pre-ignition count on the second counter at the second rate while increasing wastegate closing (or intake throttle opening) and resuming stoichiometric cylinder combustion based on the (decreasing) second pre-ignition count.

In this way, pre-ignition occurring during delivery of blow-through air can be better mitigated. By reducing valve overlap in response to the occurrence of pre-ignition during a blow-through mode, catalyst degradation induced by pre-ignition mitigating enrichment can be reduced. By limiting the engine load via valve overlap adjustments instead of intake throttle adjustments, blow-through air delivery can be rapidly resumed and turbo lag can be addressed in addition to the pre-ignition. By recognizing that pre-ignition occurring during blow-through operations is relatively transient, and by adjusting mitigating actions in accordance, pre-ignition can be reduced while still achieving reduced turbo lag benefits from engine operation with blow-through air delivery. Overall, engine performance is improved.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
    while operating in a blow-through mode, reducing valve overlap of an intake and exhaust valve by adjusting a valve actuator in response to an indication of pre-ignition and adjusting ignition timing responsive to knock, pre-ignition indicated in response to knock sensor output before a cylinder spark event, knock indicated in response to knock sensor output after the cylinder spark event,
    wherein operating in a blow-through mode includes directing intake air from an intake manifold, downstream of a compressor, to an exhaust manifold, upstream of a turbine, via positive valve overlap around TDC at an end of an exhaust stroke through one or more engine cylinders, an amount of the positive valve overlap based on operating conditions,
    wherein directing intake air via positive valve overlap includes adjusting a variable cam timing device to adjust an intake or exhaust valve timing of the one or more cylinders from a first valve timing corresponding to no positive valve overlap to a second valve timing corresponding to positive intake valve to exhaust valve overlap, and
    wherein reducing valve overlap in response to the indication of pre-ignition includes, in response to the indication of pre-ignition in any engine cylinder, adjusting the variable cam timing device to adjust the intake or exhaust valve timing of all engine cylinders from the second valve timing towards the first valve timing, an amount of valve overlap reduction increased as the indication of pre-ignition increases.

2. The method of claim 1, wherein the operating conditions include operator torque demand and turbine speed, and wherein operating in the blow-through mode is responsive to an operator pedal tip-in.

3. The method of claim 2, wherein operating in the blow-through mode is responsive to a turbine speed being lower than a threshold speed at a time of the operator pedal tip-in.

4. The method of claim 3, further comprising operating in the blow-through mode until the turbine speed reaches the threshold speed.

5. The method of claim 1, further comprising in response to the indication of pre-ignition in any engine cylinder, adjusting the variable cam timing device to adjust the intake or exhaust valve timing of all engine cylinders.

6. The method of claim 1, further comprising during the blow-through mode and when directing intake air from the intake manifold to the exhaust manifold via positive valve overlap, adjusting a fuel injection amount based on an amount of air directed via the positive valve overlap.

7. The method of claim 6, wherein the fuel injection amount is adjusted to maintain an exhaust air-to-fuel ratio at approximately stoichiometry.

8. The method of claim 1, further comprising, responsive to indication of pre-ignition during a non-blow-through operating mode, limiting an engine load.

9. The method of claim 8, where limiting the engine load includes reducing an intake throttle opening.

10. The method of claim 8, where limiting the engine load includes adjusting a waste-gate position.

* * * * *